Patented Dec. 11, 1951

2,577,984

UNITED STATES PATENT OFFICE 2,577,984

METHOD OF MAKING COLOR PRINTING PLATES

Harry Walter Warnecke, Putnam Valley Township, Putnam County, N. Y.

No Drawing. Application November 8, 1945, Serial No. 627,548

1 Claim. (Cl. 95—5.1)

This invention relates to a method of making color printing plates and to a color proof used in the method.

The ordinary method of making printing plates for color printing involves the preparation of three color-separation negatives, each of which is made by photographing through a half-tone screen so that the tones are represented by half-tone dots varying in size according to tone. Such negatives are usually termed "screened color-separation negatives." The screened color-separation negatives are printed on a resist which has been applied to a metal plate and, after development of the resist, the plate is etched through it. The plates are then inked with different colored inks and a proof is made by superimposed prints from the plates. If the proof shows improper color balance, it is necessary either to re-etch one or more of the plates by hand or to discard one or more of the plates and prepare one or more new screened color-separation negatives in which by a different exposure or otherwise the dot formation is made slightly different from that which produced the unsatisfactory plate. This procedure is so long and expensive that it is impractical to use it to provide colored pictures in daily newspapers.

The new method of making color plates which I have invented is practical for newspaper use because it provides a color proof a few hours after the subject is first photographed and before the etching of the metal printing plates. Any lack of color balance which may appear in the proof may be corrected photographically before the metal plates are etched. Thus the time and expense involved in the discarding of etched plates or in hand re-etching of the plates is entirely eliminated.

My method involves making screened color-separation transparencies and preparing a color proof from them. Colored screened positive color-separation transparencies are made photographically. They are monochromes, each of a different color. A color proof is prepared by detachably mounting the colored transparencies in register on an opaque white support. This provides a color proof which may be viewed by reflected light and which closely simulates a color print made by superimposed impressions of different colored inks from different printing plates, as the colored dots on the superimposed transparencies are positioned and superposed like the dots of colored ink from printing plates and are viewed in the same manner by reflected light.

After a color proof of satisfactory appearance has been produced, the colored transparencies are separated and each is used to make a black-and-white negative of the same dot formation. These negatives are then used as the screened color-separation negatives in making color printing plates which will produce prints whose appearance closely resembles that of the original color proof.

In order that my invention may clearly be understood, I will describe in detail a specific method embodying it:

An original colored scene is photographed by means of a one-shot color camera and the films are developed to provide a set of continuous-tone separation negatives.

Each of these negatives is photographed through a half-tone screen on a wash-off relief film of high contrast. The film is developed, tanned, bleached and washed, as is usual with wash-off relief films. The result is to provide on the transparent base of the film upstanding dots of gelatin. The films are then dyed with dyes whose colors correspond as closely as practicable with the colors of the process inks to be used for printing from the color plates to be made. The dyes, of course, take only on the gelatin dots leaving the base of the film clearly transparent, so that each film becomes a dyed screened positive color-separation transparency.

A color proof is prepared by superposing the dyed wash-off reliefs in register over a piece of white paper or other white opaque support. The films are detachably secured to the support, for example, by means of adhesive tape.

The color proof is viewed by reflected light. The light which reaches the eye by reflection from the white paper backing has passed twice through the dyed superimposed gelatin dots in much the same way as the reflected light passes twice through the superimposed dots of ink in a color print. The color proof, therefore, gives an accurate indication of the results which will be produced by printing from color plates having the same dot formation as the dyed transparencies, and, in particular, indicates whether the relative size of the dots of the different colors is such as to produce a proper color balance.

If the color balance is found defective, it may be corrected by re-photographing one or more of the original continuous-tone separation negatives through a half-tone screen to make one or more new dyed screened positive color-separation transparencies to be substituted in the color proof. The necessary correction may in some cases be made by merely changing the exposure or aperture. In other cases, shading or burning of local areas may be desirable during the exposure to make the correction. In still other cases, some retouching of one or more of the original continuous-tone separation negatives may be desirable before rephotographing.

After a satisfactory proof has been made in this way, the dyed films composing the proof are separated and used to make black-and-white negatives of the same screen formation, which may be used as screened color-separation negatives in making printing plates. This is done by making contact prints of the dyed films on high-contrast panchromatic plates. In printing the films on such plates, each exposure is made through a filter whose color is the opposite or negative of the color of the dye of the film which is being printed. Thus, the yellow dyed film is printed with a blue filter, the red film with a green filter, and the blue film with a red filter. In each case, the filter and the dye on the film cooperate to prevent any light from passing through the dyed dots of the film so as to produce on the plate a sharp-contrast dot formation which is identical with the dot formation on the dyed film.

The negatives thus produced are used as the screened color-separation negatives for making printing plates by the usual process of printing on a resist and etching. In this way, the exact dot formations of the dyed films are reproduced on the etched plates. The plates may be used in newspaper printing as soon as they have been etched as no further proofs need be made.

The wash-off relief film used in the specific method which has been described contains a contrast emulsion appropriate for a dot image. It differs in this respect from the ordinary wash-off relief film which is made with a "soft" emulsion so as to leave a gelatin surface of varying thickness which is used for dye printing. The contrast emulsion wash-off relief film used in my method, when treated in the ordinary manner, provides on the transparent support elements or dots of gelatin all of substantially the same thickness. After the gelatin elements have been dyed, the film could be used like the ordinary wash-off relief to make dye prints, but such prints are unnecessary in my method as the film itself is used as part of the color proof.

It is obvious, however, that where time for making a dye print from the three dyed wash-off reliefs is available, such print may be used as a proof instead of the superimposed wash-off relief films.

It is not necessary that the colored screened positive color-separation transparencies be made in the manner which has been described. It is desirable in some cases to use a wash-off relief film which after washing provides an unusually high relief. In this case, the upstanding dots of hardened gelatin may be colored by rolling on a colored ink. This has the advantage of permitting the use in the color proof of the same process inks as are to be used in the printed reproduction.

The source of the original continuous-tone color-separation negatives used in my method is, of course, immaterial. They may, for example, be made by screened filtered photographs of a positive color transparency such as a developed positive color film for example "Kodachrome" film.

Instead of starting with continuous-tone color-separation negatives, the method may be started from a negative color transparency such as a developed negative color film—for example a "Kodacolor" film. In this case, the screened positives on the wash-off relief films are made by photographing the developed color negative through three different color filters, a half-tone screen being used in each case to provide a dot formation on the wash-off relief.

What I claim is:

In the making of color printing plates, the step of making a color proof before the plates are etched which comprises photographing each one of a set of continuous-tone color-separation negatives through a half-tone screen on a wash-off relief film of such high contrast that it provides exposed dots, each dot extending throughout the thickness of the emulsion layer of the film and being of substantially uniform opacity and of substantially uniform cross-sectional area, developing, tanning, bleaching and washing off the films and coloring the gelatin dots remaining on each film the color of one of the process inks to be used, and superimposing the colored films in register on an opaque white background.

HARRY WALTER WARNECKE.

REFERENCES CITED

The following references are of record in the file of this patent:

UNITED STATES PATENTS

| Number | Name | Date |
|---|---|---|
| 1,711,684 | Ives | May 7, 1929 |
| 1,785,997 | Blecher | Dec. 23, 1930 |
| 1,938,291 | Hurst et al. | Dec. 5, 1933 |
| 2,169,009 | Seymour | Aug. 8, 1939 |
| 2,244,187 | Cochran | June 3, 1941 |
| 2,446,193 | Rice | Aug. 3, 1948 |
| 2,494,053 | Mitson | Jan. 10, 1950 |

FOREIGN PATENTS

| Number | Country | Date |
|---|---|---|
| 384,364 | Great Britain | Dec. 8, 1932 |
| 384,770 | Great Britain | Dec. 15, 1932 |

OTHER REFERENCES

Smith, British Journal of Photography, March 22, 1940, pages 135 and 136.

Clerc, Ilford Manual of Process Work, Ilford Ltd. London, 3d edition 1941, page 386 cited.